Figure 1:
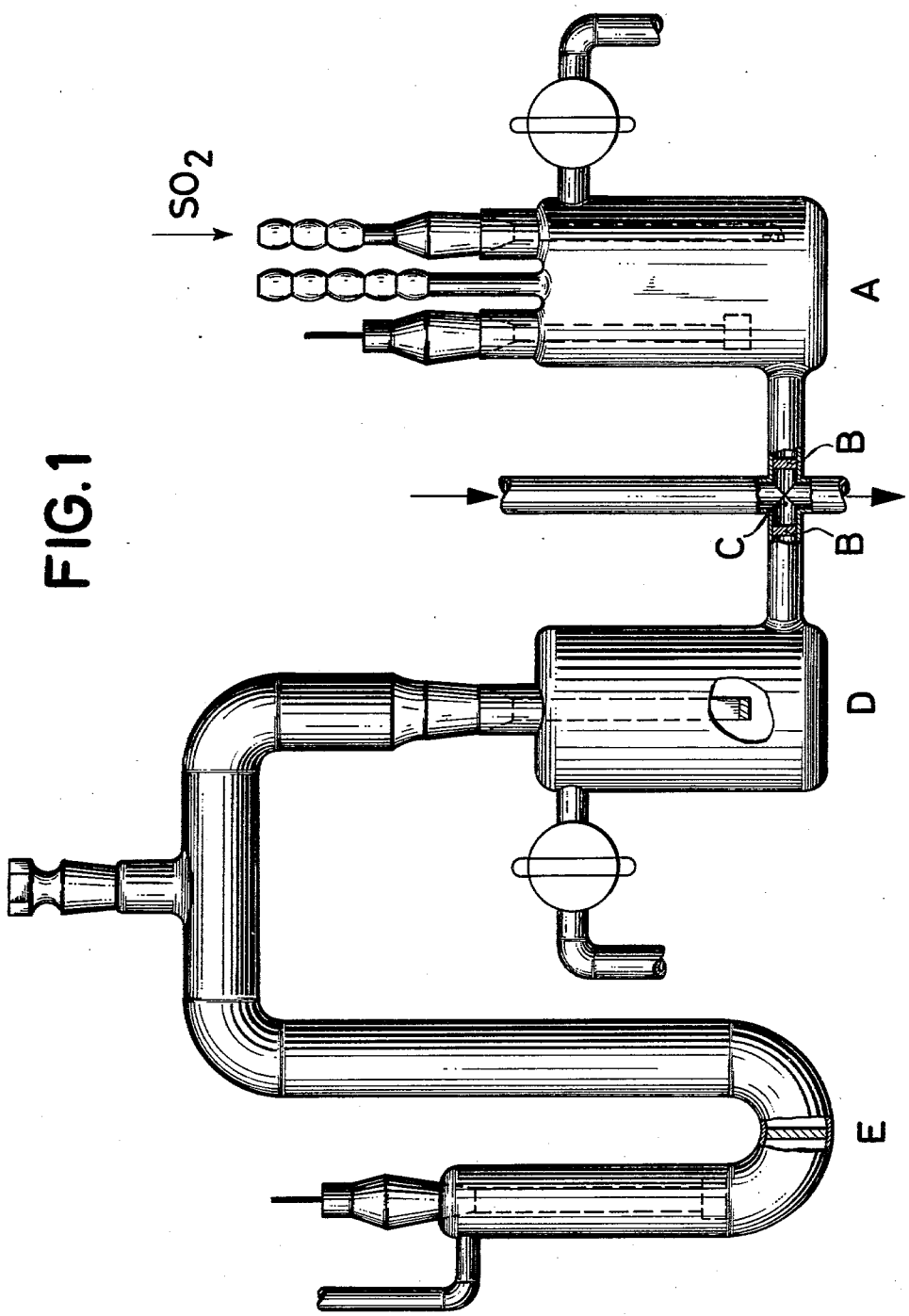

United States Patent [19]

Struck

[11] 4,191,619
[45] Mar. 4, 1980

[54] PROCESS FOR CONVERSION OF MATERIALS IN ELECTROLYTIC SOLUTION

[75] Inventor: Bernd D. Struck, Langerwehe, Fed. Rep. of Germany

[73] Assignee: Kernforschungsanlage Jülich Gesellschaft mit beschränkter, Jülich, Fed. Rep. of Germany

[21] Appl. No.: 945,693

[22] Filed: Sep. 25, 1978

[30] Foreign Application Priority Data

Sep. 29, 1977 [DE] Fed. Rep. of Germany ....... 2743820

[51] Int. Cl.$^2$ ........................... C25B 1/02; C25B 1/22
[52] U.S. Cl. ..................................... 204/104; 204/93; 204/129
[58] Field of Search .................. 204/129, 93, 101, 104

[56] References Cited

U.S. PATENT DOCUMENTS

| | | | |
|---|---|---|---|
| 2,593,540 | 4/1952 | Cornwell et al. | 210/8.5 |
| 2,723,229 | 11/1955 | Bodamer | 204/98 |
| 3,057,794 | 10/1962 | Carlin | 204/252 |
| 3,347,761 | 10/1967 | Bicek | 204/93 |
| 3,524,801 | 8/1970 | Parsi | 204/104 |
| 3,654,104 | 4/1972 | Yoshida et al. | 204/129 |
| 3,888,750 | 6/1975 | Brecher et al. | 204/129 |

FOREIGN PATENT DOCUMENTS 112358 4/1975 Fed. Rep. of Germany ........... 204/129

OTHER PUBLICATIONS

German Published patent application OS No. 2,006,660.

*Primary Examiner*—T. M. Tufariello
*Attorney, Agent, or Firm*—Frishauf, Holtz, Goodman & Woodward

[57] ABSTRACT

An electrolyte in an intermediate space between permeable partitions respectively separating the intermediate space from the anode space and the cathode space of an electrolytic cell is caused to be circulated through the intermediate space so as to remove materials migrating from one electrode space before they have an opportunity to migrate into the other electrode space. It is also of advantage for the electrolyte to contain material for reacting chemically with materials so migrating from an electrode space, in which case the slow velocity may be reduced or, for reduction of the electrical resistance, the spacing between the permeable walls may be reduced.

This type of electrolytic cell is applied especially to the sulfuric acid hybrid process.

9 Claims, 2 Drawing Figures

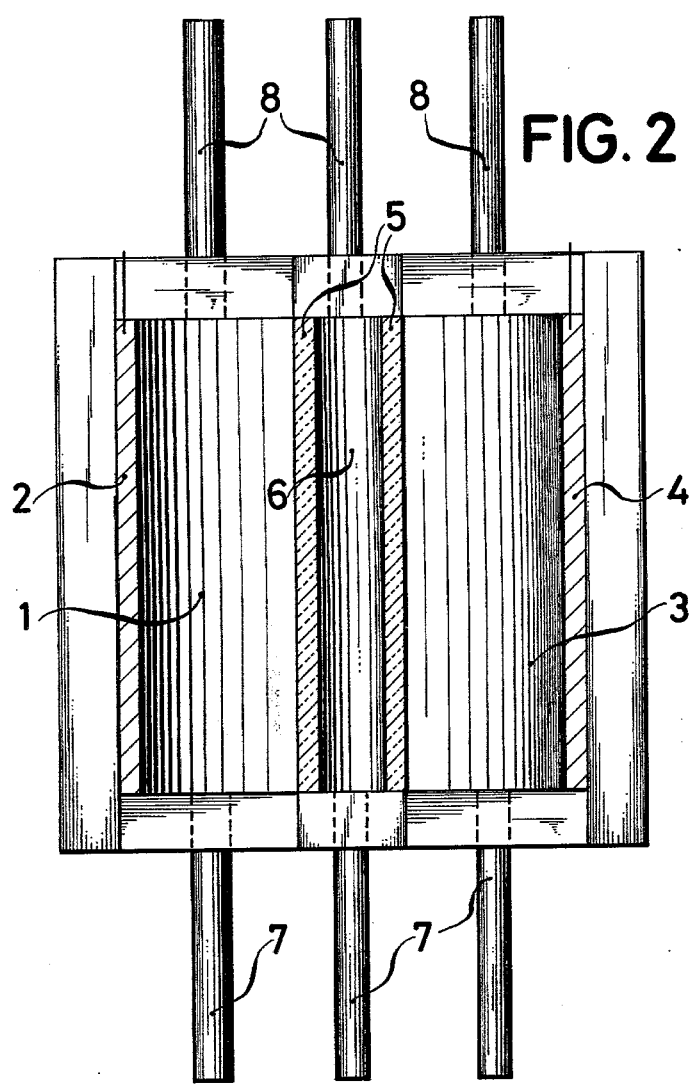

PROCESS FOR CONVERSION OF MATERIALS IN ELECTROLYTIC SOLUTION

The invention relates to a process and apparatus for electromechanical conversion materials held in electrolytic solution in which an electrolyte is subdivided into an anolyte solution, an catholyte solution, and an intermediate solution by two permeable partitions interposed between anode and cathode so as to counteract the migration of materials originally present in the anolyte and/or the catholyte and/or electrolyte chemical reaction products from the anolyte solution into the catholyte solution, and vice versa.

The separation of the anolyte, which is the electrolyte solution located in the anode space, from the catholyte, which is the electrolyte located in the cathode space, is necessary, as is known, for the carrying out of electromechanical processes when the exchange of materials respectively present in the anolyte and in the catholyte would lead to undesired bad reactions or to reducing or limiting the functional capability of an electrode. This is, for example, the case in the known process for obtaining hydrogen and sulphuric acid from water, in which process water and sulphur dioxide are supplied to a galvanic cell and hydrogen and sulphuric acid are drawn off, hydrogen ions being set free in the anolyte electrochemically by anodic oxidation of the supplied sulphur dioxide with decomposition of water and formation of sulphuric acid, while hydrogen gas is produced electrolytically from hydrogen ions at the cathode. In this known process there are particularly the disadvantages of (1) the cathodic reduction of sulphur dioxide which penetrates from the anode space into the cathode space or the anodic oxidation of trace amounts of hydrogen sulphide formed cathodically in trace amounts to precipitate sulphur and also (2) the anodic oxidation of cathodically produced hydrogen. The sulphur produced leads to the poisoning of the electrodes.

The above-mentioned process for obtaining hydrogen and sulphuric acid is an electrochemical partial step of a process known from U.S. Pat. No. 3,888,750 in which, in addition to the steps for obtaining hydrogen and sulphuric acid, electrolyte solution is taken from the anode space of the galvanic cell for the vaporizing of water and after performing vaporization, the sulfuric acid anhydride formed is decomposed by heating with the production of oxygen and sulfur dioxide. This process is also known under the name of "sulfuric acid hybride process."

Although the full efficiency of this known process is not obtainable if the transport of the materials limiting or interfering with the previously mentioned electrochemical partial process step is not prevented or largely counteracted, yet in the previously identified U.S. patent, no measures are to be found for mitigating the undesirable transposition of material from the anode space to the cathode space or vice versa.

In this connection the paper "High Efficiency Cell for Hydrogen Production" by C. J. Warde and L. E. Brecker submitted for publication to the *International Journal of Hydrogen Energy*, Aug. 2, 1976, page 2, paragraph 3, shows that by the use of glass frits as a separating membrane between anode space and cathode space the transport of sulfurous acid from the anode to the cathode is not sufficiently prevented and, therefore only a hydrogen yield of 80% relative to the amount of current used is obtained. Even by the use of a cation-selective ion exchange membrane, migration of the sulfurous acid through the membrane cannot be prevented, so that as a result only a hydrogen yield of 60% is obtainable in operation in accordance with the above-mentioned disclosure.

It is known from the *Quarterly Status Report on the Thermochemical Production of Hydrogen From Water* by M. G. Bowman, for the period ending Mar. 31, 1974, page 7, paragraph 3, to provide an excess of pressure in the cathode space relative to the anode space for preventing the transport of $H_2SO_3$ from the anode space into the cathode space, and in this case asbestos membranes or microporous rubber separators are used. This, indeed, succeeds in inhibiting penetration of $H_2SO_3$ into the cathode space as the result of the very small electrolyte flow from the cathode space into the anode space. This does not, however, prevent hydrogen cathodically formed or hydrogen sulfide formed in trace amounts from being transported out of the cathode space into the anode and in consequence being anodically oxidized to $H^+$ ions or sulfur as the case may be, thereby reducing the efficiency of the desired electrochemical reaction or, in the case of formation of sulfur, gradually poisoning the anode. It is, however, known from "Berichte der Bunsengesellschaft," Volume 77, 1973, pages 819 and 820, to carry out an electrochemical process by means of an electrolysis cell in which the cathode space is set off by means of an anion exchange membrane and the anode space by means of a cation exchange membrane. The membranes ae intended in each case to prevent the migration of one kind of ions and the diffusion of reactants or products from one of the electrode spaces into the other. Since, however, migration of materials is not fully prevented by any of the available membranes, the measures provided from the previously mentioned disclosure are effective only for short periods, for example, for time-period limited analysis processes.

It is an object of the present invention to provide a process of the kind described at the beginning of this specification in which transport of materials both out of the cathode space and into the anode space and, also, vice versa is prevented even in continuous operation. It is a further object of the invention to provide an electrolysis cell for carrying out such a method.

SUMMARY OF THE INVENTION

Briefly, the intermediate electrolyte portion into which the electrolyte solution is subdivided by the permeable partitions is caused to flow through the intervening space bounded on opposite sides by the partitions. In this manner, the result is obtained that the materials migrating into the intermediate space out of the anode space and out of the cathode space, respectively, through the permeable partitions are convectively carried away by the intermediate electrolyte solution going though the space between the partitions and, thus, do not penetrate into the other electrode space. Since the materials migrating into the intermediate space are thus carried away by the flowing electrolyte, it is not necessary to use ion-exchange membranes as permeable partitions and membranes of lower cost as; for example, glass frits, asbestos membranes, or the like; can be utilized.

In this manner, by suitable choice of the permeable partition, the spacing between the partitions, the flow velocity of the electrolyte solution, as well as the kind and composition of this solution, a system can be provided wherein the materials penetrating from one electrode space into the intermediate space do not penetrate into the oppositely disposed electrode space.

It is advantageous in such cases for the intermediate electrolyte solution to be passed in the form of a liquid layer between permeable partitions having a mutual spacing of a few millimeters. Then the electrical path resistance across the flowing electrolyte solution is kept small by the provision of a liquid layer that is as thin as possible, and it is further also advantageous, in addition, for the flowing electrolyte solution to be a solution with a high electrical conductivity.

It can also be advantageous for the intermediate electrolyte solution to be under a slight over pressure relative to the anolyte solution and the catholyte solution so that a small flow of electrolyte solution from the intermediate space sets in towards the two electrode spaces, this largely preventing the exit of materials from these spaces and thus a penetration thereof into the intermediate space. For reenforcement of this effect, it can further be useful to cause the intermediate electrolyte to flow at least in part through the permeable partitions into the anolyte and/or catholyte solution. In such case, if desired, the exit duct from the intermediate space for the electrolyte solution can be dispensed with. For the case wherein, in spite of a slight over pressure in the intermediate space, it should still be necessary to remove materials migrating there from the intermediate space, the electrolyte solution can additionally be removed by a duct communicating with the intermediate space.

A further useful variant of the process according to the invention consists in that the intermediate electrolyte solution contains a substance which through chemical reaction with material migrating into the intermediate solution through the permeable partitions leads to the formation of chemical compounds which produce no undesirable side reactions upon electrochemical decomposition or conversion of the materials. Since, in this manner, the adverse effects of the materials breaching the intermediate space is reduced, it may be conveniently possible to reduce the flow velocity of the electrolyte solution and/or to carry out the process with smaller spacing between the permeable partitions.

For carrying out the process according to the invention, it is desirable to use an electrolytic cell in which at least one duct opening into the intermediate space between the partitions provided. In this case, it is preferred and advantageous for the spacing between the two permeable partitions to be within the range of 0.5 to 10 mm. The surfaces of the permeable partitions are in such case so dimensioned that the electrical resistance is as small as possible for the passage of current through the electrolyte.

It is particularly useful to apply the invention to the process already mentioned above for obtaining hydrogen and sulfuric acid from water and sulfur dioxide in which case the electrolyte solution flowing through the intermediate space between the permeable partitions is dilute (water-containing) sulfuric acid. The concentration of the electrolyte solution can in such case be the same as that of anolyte and catholyte solutions, or can be chosen so that the conductivity of the solution is as high as possible, in order to hold down as much as possible the internal resistance of the electrolyte cell as a whole in the case of low conductivity in the anode ad cathode compartments. The electrolyte solution necessary for producing a flow through the intermediate space can be taken from the purified electrolyte of the cathode circulation path (circuit) and supplied to the intermediate space. Bromine can be added to the aqueous sulfuric acid flowing through the intermediate space for reacting with the $SO_2$ reaching the intermediate space. That reaction proceeds as follows:

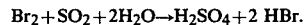

$$Br_2 + SO_2 + 2H_2O \rightarrow H_2SO_4 + 2\,HBr.$$

The inhibiting effect of the $SO_2$ on the process for obtaining hydrogen and sulfuric acid can thus be reduced.

For the permeable partitions, it is advantageous in such case to utilize ion-exchange membranes, because in the sulfuric acid process pressures up to 20 bar are provided in the anode compartment for increasing the $SO_2$ solubility and such membranes can prevent or reduce mixing of the electrolytes of the individual compartments in the case of sudden variations of pressure. A homogeneous type of catalyst such as HI or $I_2$, for example, can also be added to the electrolyte.

The application of the above-described process for obtaining hydrogen and sulfuric acid according to the invention as a partial process step in the known process for obtaining water and oxygen (sulfuric acid hybrid process) leads to an increase of the economy of the last-named process. This is already of economic significance insofar as the sulfuric acid hybrid process has the object of producing hydrogen from water by the provision of heat energy; for example, heat derived from nuclear energy; and hydrogen is used as a secondary carrier and as a chemical base material in very many ways.

THE EXAMPLES

The following examples are described with reference to the drawings in which:

FIG. 1 is a diagram of an apparatus for a process according to the invention and, FIG. 2 is a diagram of an electrolytic cell for the process of the invention.

EXAMPLE 1

In a glass cell of the kind shown in FIG. 1, there was provided as an electrolyte solution a water solution of $Na_2SO_4$ in the concentration of one mole $Na_2SO_4$ per 1 kg $H_2O$. The cell space D, which was separated from the anode space A by two glass frits B (porosity G0, diameter 10 mm, thickness 1 mm), retained in addition to the electrolyte the indicator methyl red which indicates by red coloration the $H_2SO_3$ produced in a pH range pH 6.3 to 4.2 produced by the presence of $SO_2$ by the acid reaction $SO_2 + H_2O \rightleftharpoons H_2SO_3$. The cathode was located in a further cell space E which was separated by an electrolyte bridge from the cell space D. This was necessary in order to prevent the formation of $OH^-$ ions by electrolysis in the cell space D. $SO_2$ was caused to flow througl the anode space at atmospheric pressure and room temperature and the electrolyte in the anode space A was thus saturated. Then the water solution of $Na_2SO_4$ of the above-given concentration was passed through the intermediate space C laterally bounded by the two glass frits B at an over pressure of about 30 mbar with a vertical flow velocity of 0.2 liter per hour. The horizontal current density was 100 $mA/cm^2$ between the glass frits B. Even after a five-hour period of operation, no red coloration of the indicator was observed in the cell space D. That means that no observable quantities of $SO_2$ were transported from the space A to the space D. The sulfuric acid and the protons produced by electrolysis according to the equation $SO_2+2H_2O\rightarrow H_2SO_4+2H^++2e$ also did not penetrate into the cell space D.

EXAMPLE 2

By otherwise the same conditions as in Example 1, the electrolyte solution fed into the intermediate space C was supplied in two parts, each of 0.1 liter per hour through the membranes into the anode and cathode spaces, respectively. Also, in this case, no transport of $SO_2$ or $H_2SO_3$ out of the anode space into the cathode space could be observed after five hours of operation.

FIG. 2 of the drawings shows an electrolysis cell according to the invention. It is subdivided into an anode space 1 having an anode 2, a cathode space 3 having a cathode 4 and an intermediate space 6 laterally bounded by the permeable partitions 5. In each of the three spaces there is connected a supply duct 7 and a discharge duct 8.

EXAMPLE 3

In an electrolysis cell made of thermostabilized polyvinyl chloride and which consisted of three tangent parallel cylindrical spaces, or compartments (diameter in each case 2.5 cm, height 1 cm), viz. e.g. FIG. 2, and in which the intermediate compartment is separated from the anode and cathode compartment, respectively, by ion-exchange membranes along the strips of tangency of adjacent compartments there was provided as electrolyte in the anode and cathode compartments a solution of 50% by weight, $H_2SO_4$ (sulfuric acid) and 0.02% by weight HI (hydrogen iodide). The sulfuric acid concentration in the intermediate compartment was 30% by weight. The electrolyte in the anode compartment was saturated with $SO_2$ (sulfur dioxide). The pressure was 1 bar, the temperature 80° C. The electrolytes in the individual compartments of the electrolysis cell were supplied from respective 1 liter supply vessels at a flow velocity of about 100 liters per hour in circulation. The electrolyte in the intermediate circulation loop was cleaned by flushing it with argon in the supply vessel. The current density in the electrolysis cell was 50 mA/cm$^2$.

After a long term test of 300 hours, neither $SO_2$ nor the products of $SO_2$ reduction, namely, HS and $H_2S$ (hydrogen sulfide) were detectable in the cathode compartment. HI and $I_2$ could also not be detected.

Although the invention has been described with reference to particular illustrative examples, it would be understood that variations of the embodiments are possible within the inventive concept.

I claim:

1. An electrochemical conversion process utilizing an electrolytic cell containing permeable partitions subdividing the cell into an anode chamber for an anolyte solution present at least between the anode and one of said partitions, a cathode chamber for a catholyte solution, present at least between the cathode and the other of said partitions, and an intermediate chamber for an electrolyte solution between said partitions, said partitions serving to oppose the migration of electrochemical reaction products from the anolyte solution to the catholyte solution and vice versa, said process comprising the steps of:

supplying for and during the application of electrolyzing potential to said cell in the anode chamber an aqueous solution essentially containing an oxidizable anions and hydrogen ions;

supplying to said intermediate and cathode chambers an initial solute in water solution essentially containing hydrogen ion and an oxidation product of the said oxidizable ions supplied to said anode chamber and circulating said solutions in said intermediate and cathode chambers during application of electrolyzing potential, the circulation of said solution in said intermediate chamber being such as to pass it through the space between said partitions in such a manner that the flow of said solution through said space is laterally bounded on opposite sides by said partitions, whereby migration of said oxidizable anion into said cathode chamber is substantially prevented.

2. A process as defined in claim 1, in which the flow of said solution in said intermediate chamber is maintained as an even flow of a layer of liquid a few millimeters thick, and in which said partitions are spaced a few millimeters apart.

3. A process as defined in claim 1, in which said solution in said intermediate chamber is maintained at slightly greater pressure relative to said anolyte solution and to said catholyte solution.

4. A process as defined in claim 3, in which said intermediate electrolyte solution is caused to flow at least in part into said anolyte solution through one of said partitions.

5. A process as defined in claim 3, in which said intermediate electrolyte solution is caused to flow at least in part into said catholyte solution through one of said partitions.

6. A process as defined in claim 3, in which said intermediate electrolyte solution is caused to flow in part into said anolyte solution and in part into said catholyte solution.

7. A process as defined any of the preceding claims, in which said solution in said intermediate chamber contains an oxidizing agent for reaction with amounts of said oxidizable anions which penetrate into said intermediate chamber from said anode chamber.

8. A process as defined in claim 1, claim 2 or any of claims 3–6, in which said oxidizable ion consist essentially of sulphite ions and are provided by supplyin sulphur dioxide to said anolyte and in which process hydrogen ions are electrochemically liberated in the anolyte by anodic oxidation of the supplied sulfur dioxide and sulfite ions with decomposition of water and formation of sulfuric acid, and sulfate ions, and in which process also hydrogen gas is produced form hydrogen ions at the cathode, and said electrolytes respectively circulated through said intermediate and cathode chambers are water solutions of sulphuric acid.

9. A process as defined in claim 8 in which bromine is supplied to said electrolyte circulated through said intermediate chamber for oxidizing sulphite ions which penetrate from said anode chamber into said intermediate chamber.

* * * * *